(12) United States Patent
Wheelock

(10) Patent No.: US 9,787,768 B1
(45) Date of Patent: Oct. 10, 2017

(54) M-CMTS, EDGE-QAM AND UPSTREAM RECEIVER CORE TIMING SYNCHRONIZATION

(71) Applicant: ARRIS Group, Inc., Suwanee, GA (US)

(72) Inventor: Ian Wheelock, Cork (IE)

(73) Assignee: ARRIS Enterprises LLC, Suwanee, GA (US)

(*) Notice: Subject to any disclaimer, the term of this patent is extended or adjusted under 35 U.S.C. 154(b) by 344 days.

(21) Appl. No.: 13/832,756

(22) Filed: Mar. 15, 2013

(51) Int. Cl.
  H04L 29/08   (2006.01)
  H04L 7/00    (2006.01)
  H04L 12/28   (2006.01)
  G06F 15/16   (2006.01)

(52) U.S. Cl.
  CPC ........ *H04L 67/1095* (2013.01); *H04L 7/0037* (2013.01); *H04L 12/2801* (2013.01)

(58) Field of Classification Search
  CPC .............. H04J 3/0682; H04L 12/2801; H04L 67/1095; H04L 7/0037
  USPC .......... 709/248; 725/109; 375/257; 370/503
  See application file for complete search history.

(56) References Cited

U.S. PATENT DOCUMENTS

| | | | |
|---|---|---|---|
| 7,023,816 B2 | 4/2006 | Couillard | |
| 7,197,045 B2* | 3/2007 | Amit | 370/445 |
| 7,697,546 B2* | 4/2010 | Currivan et al. | 370/395.62 |
| 2001/0017600 A1* | 8/2001 | Torikoshi | G04R 40/06 342/357.29 |
| 2012/0300859 A1* | 11/2012 | Chapman et al. | 375/257 |
| 2013/0156117 A1* | 6/2013 | Liu | H04L 7/0037 375/257 |

FOREIGN PATENT DOCUMENTS

WO    WO 2012028851 A1 *   3/2012    ......... H04N 21/4126

OTHER PUBLICATIONS

Brady Volpe, DOCSIS 3.0 Tutorial—DOCSIS Timing Interface Specification, Jul. 5, 2010, The Volpe Firm, http://volpefirm.com/dti/.*
Official Action, Re: U.S. Appl. No. 13/833,450, dated Aug. 6, 2014.
Official Action, Re: U.S. Appl. No. 13/833,450, dated Dec. 5, 2013.

* cited by examiner

*Primary Examiner* — David Lazaro
*Assistant Examiner* — Zi Ye
(74) *Attorney, Agent, or Firm* — Thomas A. Ward

(57) ABSTRACT

Systems and methods of this disclosure can operate to synchronize timing between communication devices and can include a timing server. The timing server can provide a communications interface for the exchange of timing messages to a first communication device. Using existing protocol messages defined in the M-CMTS architecture, additional communication devices can intercept, snoop, and extract timing information from messages between the first communication device and the timing server to adjust their internal clocks to maintain timing synchronization thereby reducing the number of communication interfaces required from a timing server.

15 Claims, 3 Drawing Sheets

M-CMTS, EDGE-QAM AND UPSTREAM RECEIVER CORE TIMING SYNCHRONIZATION

TECHNICAL FIELD

This disclosure relates to systems and methods for core timing synchronization.

BACKGROUND

The Data-Over-Cable Service Interface Specification (DOCSIS) was established by cable television network operators to facilitate transporting data packets, primarily internet packets, over existing community antenna television (CATV) networks. In addition to transporting data packets, as well as television content signals over a CATV network, multiple services operators (MSO) also use their CATV network infrastructure for carrying voice, video on demand (VoD) and video conferencing packet signals, among other types.

Broadband services can be delivered via existing cable infrastructure from MSOs, digital subscriber lines (xDSL), integrated service digital network (ISDN), public switched phone networks, or T1 connections from telecommunications operators or internet service providers, satellite from satellite operators, or wireless services (such as, e.g., cellular, 802.11 or Wi-MAX standards, etc.) from wireless service providers, among many others. In some DOCSIS implementations, a modular cable modem termination (M-CMTS) architecture can be comprised of components such as, for example, an M-CMTS core, Edge-QAM (EQAM), upstream receiver and DOCSIS Timing Interface (DTI) server. The M-CMTS architecture can provide operators with increased efficiency and availability of network resources.

An element of the communication system architecture is the separation of a downstream physical layer QAM modulation and up-conversion functions from a traditional CMTS to EQAMs and upstream receivers. The separation allows the EQAM to support both video and DOCSIS standards thereby facilitating operators using the same network resources to support multiple types of services such as, for example, data, voice and video.

The interface supporting the separation of a broadband communication system (e.g., M-CMTS core) and modulator/demodulator systems (e.g., EQAM(s)/upstream receiver(s)) is defined by the DOCSIS standards as a Downstream External PHY Interface (DEPI), which provides for transport of downstream data between M-CMTS core and EQAM(s) and the transport of upstream data between the upstream receiver(s) and M-CMTS. A component of the DEPI interface is a DTI server, defined by the DOCSIS Timing Interface Specification (DTI) which can provide the exchange of timing messages between a DTI sever and DTI clients (e.g., M-CMTS core, EQAM(s) and upstream receiver(s)) to synchronize timing between the devices.

DETAILED DESCRIPTION

In some implementations of this disclosure, systems and methods can operate to provide timing synchronization between an M-CMTS, EQAM(s), and upstream receivers through snooping existing protocol messages defined in the M-CMTS architecture thereby reducing the number of DTI server communication interfaces.

The DOCSIS DTI specification defines a protocol and timing messages between a DTI server and DTI client. The DTI server can use a separate interface for two-way communication with a DTI client to ensure a master clock and time stamp are synchronized between each client. Two-way communication between the DTI server and DTI clients can allow the DTI server to determine the propagation delay to each client and generate timing messages providing timing correction values that can include a time offset to maintain synchronization of the master clocks and time stamps. In some implementations, where the propagation delay between a DTI server and DTI clients is similar or can be accounted for, other DTI clients can snoop the timing messages between the DTI server and a first DTI client and adjust their master clocks and time stamps as if they were the first DTI client.

Figure 1:
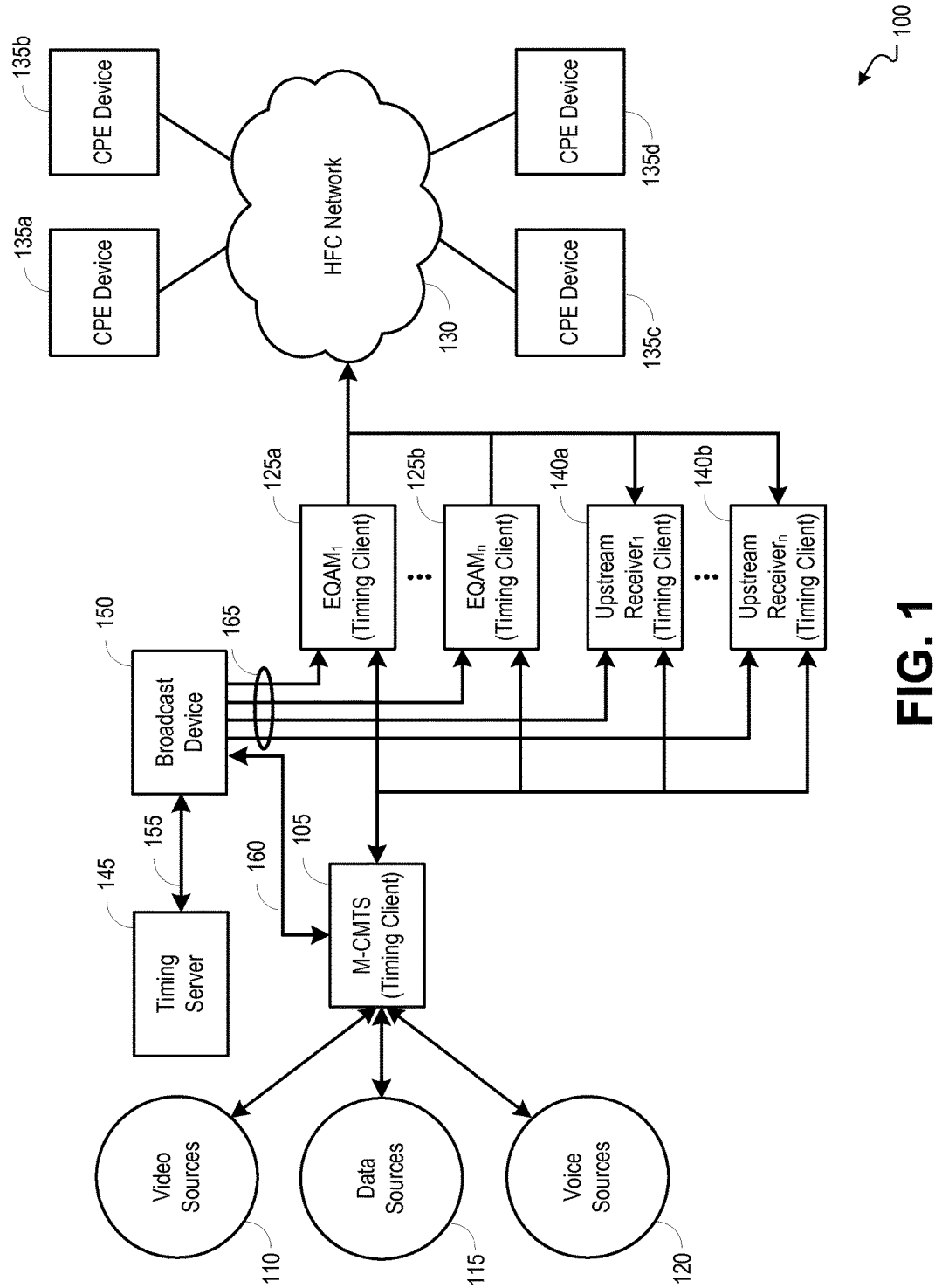
FIG. 1 is a block diagram illustrating an example network environment operable to provide an M-CMTS architecture with a timing server.

FIG. 1 is a block diagram illustrating an example network environment operable to provide the M-CMTS architecture with timing synchronization (e.g., DTI server). In some implementations, the M-CMTS 105 core can transmit and/or receive information from/to video, data and video sources 110, 115 and 120 respectively. The M-CMTS core 105 can send video, data, and/or voice information to EQAM(s) 125a-b. In other implementations the EQAM(s) can receive video from video sources 110 directly (not shown). EQAM(s) 125a-b can then transmit downstream video, data and voice through the hybrid fiber coax (HFC) network 130 to the end user at a customer premise device(s) 135a-d. CPE device(s) 135a-b can be cable modems (CMs), enhanced multimedia terminal adapters (eMTAs), gateway devices (GW) and/or set top boxes. Additionally, upstream receiver(s) 140a-b can receive data and/or voice information from CPE device(s) 135a-d through HFC network 130 for transmission to M-CMTS core 105.

To ensure reliable communication on a HFC network 130 the master clocks and time stamps of the M-CMTS core 105, EQAM(s) 125a-b and upstream receiver(s) 140a-b can be synchronized. In some implementations, a timing server 145 can provide timely and accurate communication with timing clients (e.g., M-CMTS core 105, EQAM(s) 125a-b and upstream receiver(s) 140a-b) providing timing correction values, thereby synchronizing the timing clients.

The timing server 145 can initiate communication with a timing client based on a master clock where a timing client can immediately reply with a value that can represent a phase error between timing client and server master clocks. The timing server 145 can use the time difference between sending and receiving timing messages to/from a timing client to determine and auto-compensate any delays between the timing server 145 and timing client. The timing server 145 can send timing messages including timing correction values to the timing client that can include time stamp and clock adjustment values based on the time difference. Communication between the timing server and a timing client can occur continually.

The M-CTMS 105 can use a master clock synchronized with a master clock from the timing server 145 to create time stamps. The time stamp values can be used by the M-CMTS 120 to generate downstream messages (e.g., DOCSIS MAP) for allocating upstream transmission opportunities for CPE device(s) 135a-135d. The EQAM(s) 125a-b can use a master clock synchronized to the master clock from the timing server 145 for symbol rate generation. The time stamp value can be used by the EQAM(s) 125a-b to create messages (e.g., DOCSIS SYNC) to CPE device(s) 135a-d to maintain synchronization for upstream transmission opportunities. The upstream receiver(s) 140a-b can use a master clock synchronized with the master clock from the DTI server 145 for receiving upstream communication from CPE device(s) 135a-b. The time stamp value can be used by the upstream receiver(s) to determine the time to look for upstream transmissions from CPE device(s) 135a-b.

Broadcast device 150 can provide two-way communication links 155 and 160 enabling timing server 145 to communicate with the M-CMTS core 105. In some implementations, broadcast device 150 can replicate the transmissions from timing server 145 to M-CMTS core 105 on communications links 165. In other implementations, broadcast device 150 can replicate both the transmissions from timing server 145 to M-CMTS core 105 and communications from M-CMTS core 105 to timing server 145 on communication links 165. In another implementation, broadcast device 145 can be a standard ethernet hub.

EQAM(s) 125a-b and upstream receiver(s) 140a-b can receive timing server 145 to M-CMTS core 105 timing messages on communication links 165. In some implementations, separate communication links 165 can be used between each EQAM(s) 125a-125b and upstream receivers(s) 140a-b. In other implementations a single communication link 165 can be shared between EQAM(s) 125a-b and upstream receiver(s) 140a-b (not shown). In another implementation, a combination of dedicated and shared communication links can be used (not shown).

In some implementations, EQAM(s) 125a-b and upstream receivers(s) 140a-b can adjust their master clock and time based on timing correction values received from snooping and extracting information messages on communication links 165 where broadcast device 150 replicates communication messages from timing server 145 to M-CMTS core 105. The timing correction values from the timing server 145 to M-CMTS core 105 can be based on a propagation delay between the timing server 145 and M-CMTS core 105. In some implementations, the communication links 165 can be similar in length to communication link 160. In other implementations, EQAM(s) 125a-b and upstream receiver(s) 140a-b can each include a local timing correction factor that can used in conjunction with timing correction values accounting for propagation delay differences.

M-CTMS core 105, EQAM(s) 125a-b and upstream receiver(s) 140a-b can all be timing clients. In some implementations, one of EQAM(s) 125 can participate in two way communication with timing server 145 while the M-CMTS core 105, upstream receiver(s) 140a-b and the other EQAM(s) 125 snoop the timing server 145 transmissions to the EQAM 125 (not shown). In other implementations, one of the upstream receiver(s) 140 can participate in two-way communication with timing server 145 while the M-CMTS core 105, EQAM(s) 125a-b and other upstream receiver(s) 145 snoop the timing server 145 transmissions to the upstream receiver 140 (not shown).

In some implementations, the timing server 145 can be a standalone device. In other implementations the timing server 145 can be integrated in the M-CMTS 105 (not shown).

Figure 2:
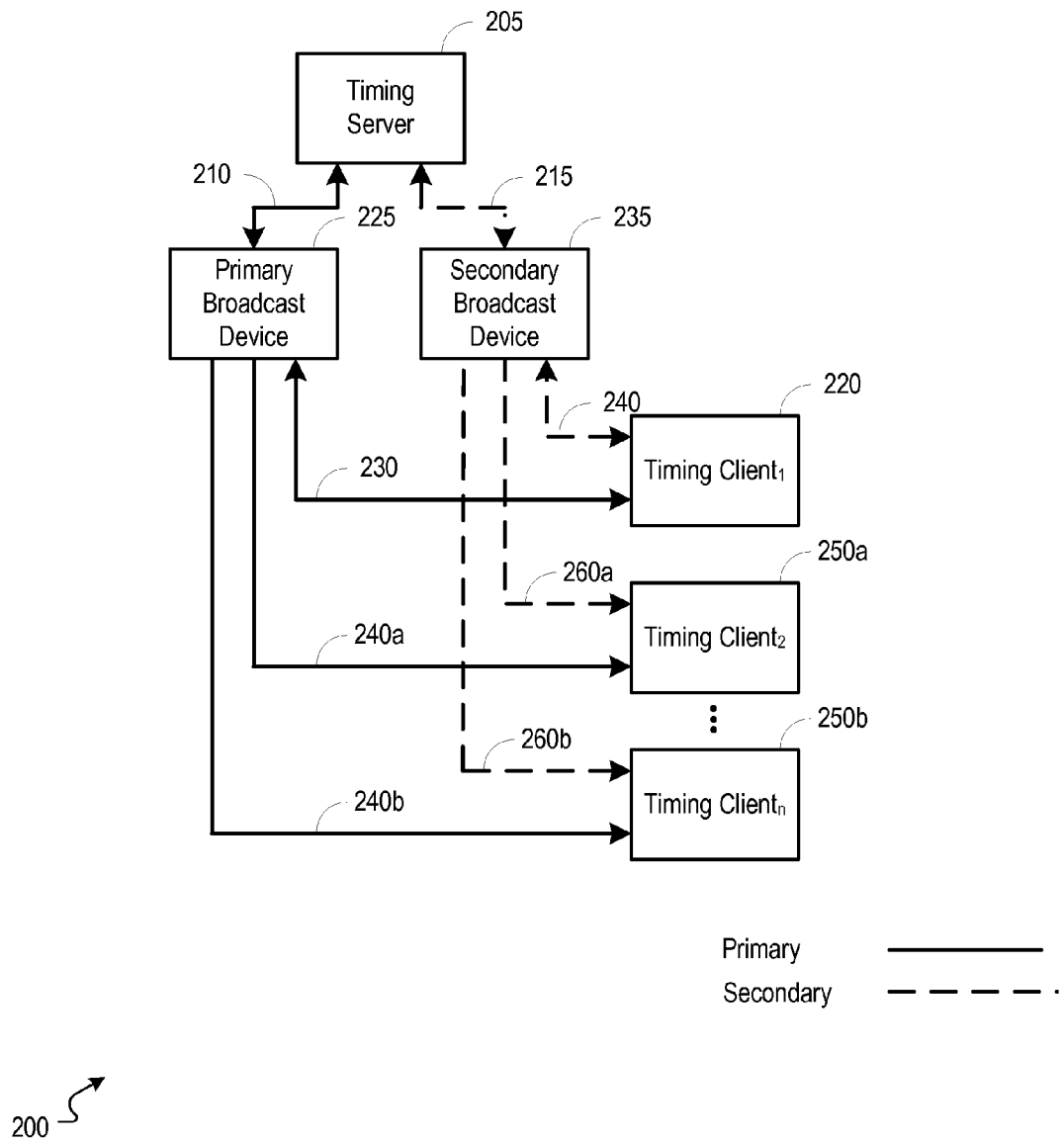
FIG. 2 is a block diagram illustrating an example network environment operable to provide an M-CMTS architecture with redundant timing communication links.

FIG. 2 is a block diagram illustrating an example network environment operable to provide an M-CMTS architecture with redundant timing communication links. The timing synchronization between timing clients (e.g., timing clients 105, 125a-b and 140a-b of FIG. 1) can be critical in providing reliable communication to CPE device(s) (e.g., CPE device(s) 135a-d of FIG. 1). In some implementations, the timing server 205 (e.g., timing server 145 of FIG. 1) can provide a primary timing interface 210 and a secondary time interface 215 that can serve as a redundant timing interface if primary communication path is not operable between the timing server 205 and timing clients 220 and 250a-b. In other implementations, two timing servers 205 can be used where each one provides a primary timing interface and the other provides a secondary timing interface (not shown).

In some implementations, two broadcast devices (e.g., broadcast device 150 of FIG. 1) can be used to provide redundant two-way communication between timing server 210 and timing client 220. Primary broadcast device 225 can deliver two-way communication between timing server 210 and timing client 220 through communications links 210 and 230. Secondary broadcast device 235 can be used to provide a redundant two-way communication path between timing server 205 and timing client 220 through secondary links 215 and 240.

In some implementations, primary broadcast device 225 can replicate communications between timing server 205 and timing client 220 on communication link 210 onto communication links 240a-b enabling timing clients 250a-b to snoop timing messages between the timing server 205 and timing client 220. Secondary broadcast device 235 can provide a secondary or redundant communications path to the timing clients 250a-b for snooping through replicating communications between timing server 205 and client 220 on communication link 215 onto communications link 260a-b.

Figure 3:
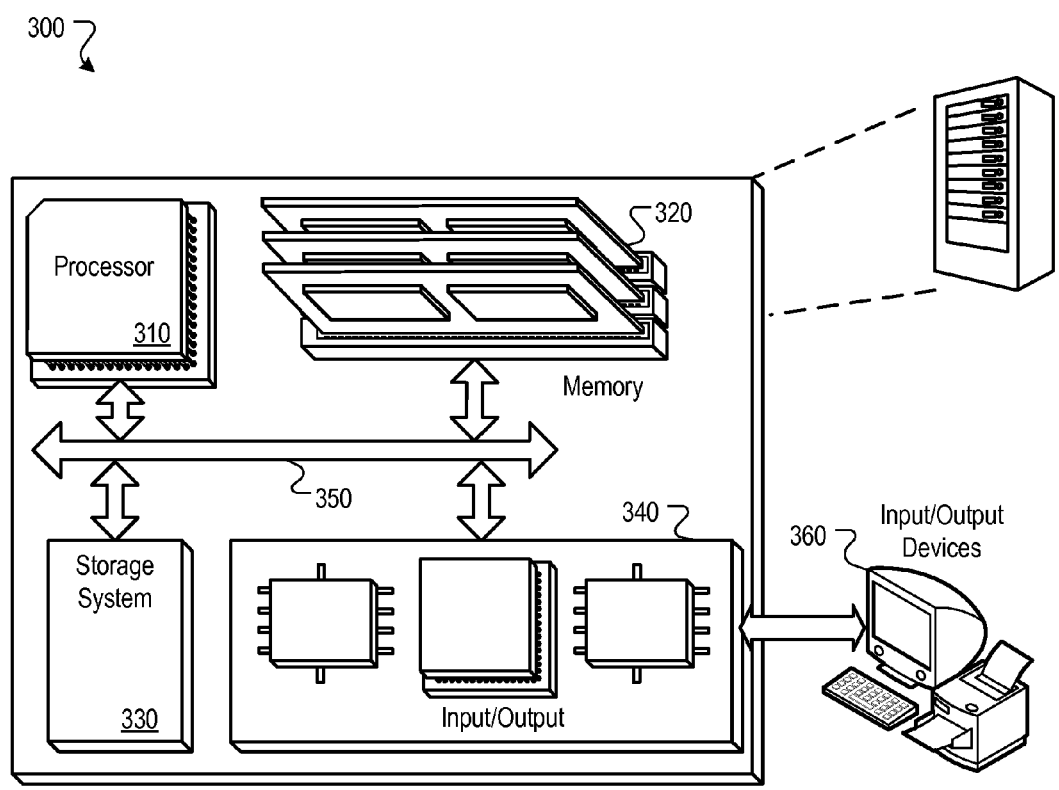
FIG. 3 is a block diagram of a timing client operable to provide timing synchronization with other timing clients.

FIG. 3 is a block diagram of a timing client operable to provide timing synchronization with other timing clients. The timing client 300 can include a processor 310, a memory 320, a storage device 330, and an input/output device 340. Each of the components 310, 320, 330, and 340 can, for example, be interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330.

The memory 320 stores information within the device 700. In some implementations, the memory 320 is a computer-readable medium. In various implementations, the memory 320 can be either a volatile memory unit or a non-volatile memory unit.

In some implementations, the storage device 330 is capable of providing mass storage for the device 300. In one implementation, the storage device 330 is a computer-readable medium. In various different implementations, the storage device 330 can, for example, include a hard disk device, an optical disk device, flash memory or some other large capacity storage device.

The input/output device 340 provides input/output operations for the device 300. In one implementation, the input/output device 340 can include one or more of a wireless interfaces. In addition, such input/output device 340 can communicate with other external devices through interfaces such as, for example, an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other input/output devices, as well as sending communications to, and receiving communications from various networks.

The device (e.g., a timing client device) of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors (general microprocessors being transformed into special purpose microprocessor through the application of algorithms described herein), and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a phone, a cable modem, a set-top box, a mobile audio or video player, or a game console, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed:

1. A system, comprising:
   a timing server operable for two-way communication through a broadcast device to a first timing client, the broadcast device residing between the timing server and the first timing client;
   the timing server further operable to generate one or more timing messages for the first timing client, the one or more timing messages comprising a change in timing information to the first timing client-based on a time difference identified between the timing server and the first timing client;
   the broadcast device operable to communicate with one or more additional timing clients, wherein the one or more timing messages sent from the timing server to the first timing client, the one or more timing messages comprising the change in timing information based on communication between the timing server and the first timing client, are replicated and broadcast to the one or more additional timing clients,
   wherein the one or more additional timing clients are operable to receive and process the one or more replicated timing messages though the one or more timing messages were generated based on the time difference identified between the timing server and the first timing client,
   wherein process the one or more replicated timing messages includes:
      extracting one or more timing correction values from the replicated timing messages; and
      adjusting internal timing based on the extracted timing correction values.

2. The system of claim 1, wherein the timing server generates the one or more timing messages defined by the Data-Over-Cable Interface Specification (DOCSIS) Timing Interface Specification (DTI).

3. The system of claim 2, wherein the timing server is implemented by a modular cable modem termination system (M-CMTS).

4. The system of claim 1, wherein the additional timing clients comprise one or more Edge-QAM(s).

5. The system of claim 1, wherein the additional timing clients comprise one or more upstream receiver(s).

6. The system of claim 1, wherein the one of the additional timing clients comprises a modular cable modem termination system (M-CMTS).

7. The system of claim 1, wherein the first timing client comprises one of a modular cable modem termination system (M-CMTS), Edge-QAM, and upstream receiver.

8. The system of claim 1, wherein the broadcast device communicates with the one or more additional communication devices through one of dedicated, shared and a combination of dedicated and shared communication links.

9. The system of claim 1, wherein the broadcast device is implemented with a standard ethernet hub.

10. A method, comprising:
    transmitting, by a timing server, one or more timing correction messages through a broadcast device to a first timing client based on a time difference identified between the timing server and the first timing client, wherein the broadcast device provides two-way communication between the timing server and the first timing client;
    replicating and transmitting, by the broadcast device, the timing correction messages to one or more additional timing clients, the timing correction messages including a timing correction value based on the time difference identified between the timing server and the first timing client;
    processing, by the one or more additional timing client, the timing correction message includes:
       snooping the replicated timing correction messages;
       extracting one or more timing correction values from the snooped timing correction messages; and
       adjusting internal timing based on the extracted timing correction values.

11. The method of claim 10, wherein redundant broadcast devices are used to replicate and transmit the timing correction messages.

12. The method of claim 10, wherein a broadcast device is used to replicate and transmit the timing correction messages, wherein the delay between the broadcast device and the first timing client approximates the communication path delay between the broadcast device and the additional timing clients.

13. The method of claim 10, wherein redundant communication links are used to transmit the timing correction messages to the first timing client and additional timing clients.

14. The method of claim 10, wherein a local timing correction factor is applied in conjunction with the timing correction values for adjusting internal timing.

15. The method of claim 10, wherein the timing correction value is one of a clock correction value and time stamp.

* * * * *